United States Patent [19]
Braden et al.

[11] 3,812,221
[45] May 21, 1974

[54] PREPARATION OF W-AMINO-ALKANE PHOSPHONIC AND PHOSPHINIC ACID DERIVATIVES

[75] Inventors: Rudolf Braden, Odenthal-Scheuren; Udo Hendricks; Gunter Oertel; Reinhard Schliebs, all of Cologne, Germany

[73] Assignee: Bayer Aktiengesellschaft, Leverkusen, Germany

[22] Filed: June 29, 1971

[21] Appl. No.: 158,088

[30] Foreign Application Priority Data
July 2, 1970  Germany.......................... 2032712

[52] U.S. Cl............. 260/968, 260/403, 260/465.1, 260/502.5, 260/944, 260/945, 260/987

[51] Int. Cl. ............................................. C07f 9/28
[58] Field of Search................. 260/502.5, 968, 944

[56] References Cited
UNITED STATES PATENTS
3,052,709   9/1962   Strube et al. .................. 260/968 X OTHER PUBLICATIONS
"Synthetic Organic Chemistry," Wagner et al., J. Wiley & Sons, Inc., New York, (1953), pp. 658–660.

*Primary Examiner*—Anton H. Sutto
*Attorney, Agent, or Firm*—Connolly and Hutz

[57] ABSTRACT

Preparation of the title derivatives by hydrogenation of a salt of the corresponding $\omega$-cyano-alkane phosphonic or phosphinic acid derivative.

1 Claim, No Drawings

PREPARATION OF W-AMINO-ALKANE PHOSPHONIC AND PHOSPHINIC ACID DERIVATIVES

Only few methods have so far been described for the preparation of ω-amino-alkane phosphonic and phosphinic acid derivatives, for example it is known that ω-amino-ethane-phosphonic acid, which also occurs in biological systems, may be prepared by a multistage synthesis which is difficult to carry out (see Przemyslaw Mastalerz, Acta Biochim. Polon, 15, 151/173 (1969)).

N-substituted α-amino-alkane phosphonic acid dialkyl esters may be obtained e.g., by reacting phosphorous acid diesters and carbonyl compounds in the presence of primary or secondary amines (see Houben-Weyl, Methoden der Organ. Chemie 4th Edition, Volume XII/1 page 484).

These processes cannot be applied directly to prepare ω-amino-alkane phosphonic and phosphinic acid derivatives and they have the further disadvantage that they involve considerable expenditure so that they are not suitable for carrying out on a large scale.

A process for the preparation of ω-amino-alkane phosphonic or phosphinic acid derivatives has now been found which is characterised in that ω-cyanoalkane phosphonic or phosphinic acid derivatives are converted into a corresponding salt which is then hydrogenated with hydrogen carriers.

It was found, surprisingly, that the hydrogenation of such salt-type compounds proceeds smoothly and with the production of very high yields whereas when attempts are made to hydrogenate the corresponding esters, e.g. the dimethyl ester of ω-cyanoalkane phosphinic acid, unidentified non-volatile condensation products were obtained instead of the expected amines. It may be presumed that hydrogenation is accompanied by intermolecular and intramolecular changes which prevent the formation of the required compounds.

Numerous derivatives of ω-amino-alkane phosphonic or phosphinic acid may be prepared by the process according to the invention. These compounds, which may be regarded quite generally as aliphatic primary amines which contain phosphorus linked to carbon, may be represented by the following formula:

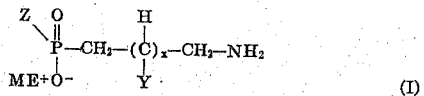

wherein Y is hydrogen or alkyl having one to four carbon atoms, e.g., methyl, ethyl, propyl, isopropyl, butyl or isobutyl; Z is a hydrocarbon radical selected from the group consisting of alkyl having one to five carbon atoms, e.g., methyl, ethyl, propyl, isopropyl, butyl, isobutyl, pentyl or isopentyl, cycloalkyl having three to six carbon atoms, e.g. cyclopropyl or cyclohexyl and an aromatic hydrocarbon radical having six to 10 carbon atoms, e.g., phenyl, tolyl or napthyl or one of said hydrocarbon radicals attached to the adjoining phosphorous atom via an oxygen atom; ME is an alkali metal or an ammonium ion, e.g., sodium, potassium, cesium, rubidium or $NH_4$; and $x$ is 0 or 1.

The salts required for the process of the invention may be obtained e.g., by saponification of the corresponding esters with metal hydroxides or ammonium hydroxide in accordance with the following reaction equation: (Equation 1

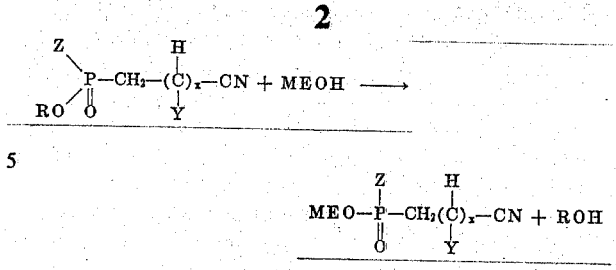

wherein Y, Z, ME, and $x$ have the same meaning as in formula I and R is alkyl, hydroxyalkyl or haloalkyl having one to 10 carbon atoms, allyl, cycloalkyl having three to six carbon atoms, benzyl or an aromatic hydrocarbon having six to 10 carbon atoms. The preferred radicals include methyl, ethyl, propyl, isopropyl, allyl, benzyl, hydroxymethyl and chloromethyl.

This saponification proceeds readily, with the production of high yields. Saponification of lower esters proceeds exothermally whereas with higher esters slight heating may be required. Temperatures of the order of from 0° to 75°C are generally satisfactory. Suitable metal salts which undergo a saponification reaction with esters may be used instead of metal hydroxides. Alternatively, the corresponding phosphonic or phosphinic acids may be used directly as starting material.

The identity of the hydrogenating agent of the present invention is not critical. It may be a hydrogen carrier such as a metal hydride, e.g., lithium aluminium hydride. However, it has been found especially advantageous to carry out catalytic hydrogenation with hydrogen and conventional catalysts such as Raney nickel, Raney cobalt, Raney iron or platinum metals at elevated pressure. The catalytic hydrogenation is generally carried out in the presence of a solvent in which the salts are to a large extent soluble. In principle, any solvents which are resistant to alkalies may be used. It is preferred to use an aqueous alcoholic solvent, e.g., a mixture of water and methanol. When using a solvent based on water and alcohol it is advisable in cases where the starting material is produced by saponification to use as the alcoholic component an alcohol which is also formed on saponification of the starting material.

In a preferred embidiment of the process according to the invention, the salt solution together with a hydrogenation catalyst such as Raney nickel or Raney cobalt is treated with liquid ammonia in an autoclave. Hydrogenation is then carried out at temperatures of 0°C to 160°C, preferably 20°C to 100°C. The choice of pressure is not particularly critical. Pressures in the range of from 5 atmospheres to 150 atmospheres of hydrogen are generally sufficient.

The time required for hydrogenation depends to some extent on the compound used. Hydrogenation is generally completed in a few hours. It is advisable to keep the hydrogenated system under pressure for some time after absorption of hydrogen ceases to be detectable, in order to ensure complete hydrogenation.

After cooling and release of the hydrogen pressure and ammonia pressure, the reaction products are worked up. The reaction mixture is worked up by filtering off the catalyst and then concentrating the filtrate by evaporation, the solid or highly viscous ω-amino-alkane phosphonic or phosphinic acid derivatives being left as residue in an almost pure state.

The nitrile starting materials of equation 1 may be obtained e.g., by reacting phosphorous acid diesters (example 1, 4 and 5) or methane phosphonous acid monomethyl ester (example 3) and acrylonitrile (example 1, 3 and 4) or α-methacrylonitrile (example 5) (see Houben-Weyl, Methoden der Organ. Chemie, 4th Edition, Volume XII/1 page 465).

The compounds prepared by this process are valuable intermediate products which are very suitable for the production of flame resistant and surface active substances.

For the production of surface active substances these compounds are reacted with long-chained fatty acid chlorides having eight to 22 carbon atoms, e.g., palmitic acid chloride, oleic acid chloride, stearic acid chloride.

The derivatives thereby being formed are secondary amides of these fatty acids, wherein the aliphatic primary amine components are the compounds of formula (I).

Flame resistant substances can be obtained by reaction of epichlorohydrin with the amine-phosphorous compounds, herein described. Reaction products, containing about one to two mols epichlorohydrin per mol phosphorous compound are formed (see Houben-Weyl, Methoden der organ. Chemie, 4th Edition, Volume XI/1 page 311).

The process of the invention will now be described more fully with the aid of examples.

EXAMPLE 1

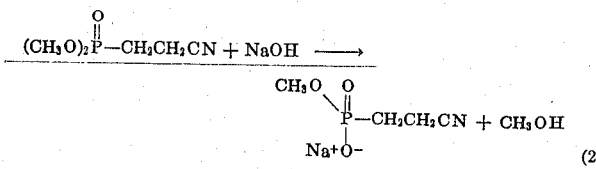

1 mol (= 80 g) of a 50 percent aqueous sodium hydroxide solution was added dropwise at about 40°C to 50°C to 1 mol (= 163 g) of the dimethylester of 2-cyanoethane phosphonic acid.

The reaction was exothermic and cooling was necessary. A sample of the reaction mixture, which was neutral when the reaction was complete, was concentrated by evaporation. On the evidence of the infra-red spectrum, the residue contained only nitrile bands and no carboxylic acid amide or carboxylic acid bands. Saponification took place selectively at the phosphonic acid ester group.

EXAMPLE 2

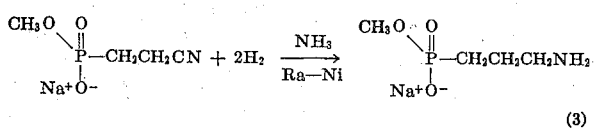

19.2 Litres of a 50 percent aqueous solution of the sodium salt of the monomethyl ester of 2-cyanoethanephosphonic acid prepared according to Example 1, 6 litres of liquid ammonia and 300 g of Raney nickel were introduced into a stainless steel autoclave which was equipped with an anchor agitator and a gas inlet. After it had been sealed, the autoclave was washed with nitrogen several times and hydrogen was then forced in to a pressure of 30 atmospheres. The autoclave was warmed to 50°C for 25 minutes and the pressure reduced. Hydrogenation was carried out in the pressure interval of 50 to 30 atmospheres of hydrogen in the temperature range of 50°C to 60°C. Uptake of hydrogen terminated after 6 hours. The pressure and temperature were then maintained for a further one-half hour at 60°C and 50 excess atmospheres; the autoclave was then cooled and the hydrogen and ammonia were released, and the solution was freed from catalyst by filtration.

A sample of the solution obtained was evaporated to dryness and the amine contents were determined by acidimetric titration. The contents determined were generally 90 to 98 percent of the theoretical contents.

Another sample was investigated by infra-red spectroscopy. Only a very low proportion of carbonamide bands could be found.

EXAMPLE 3

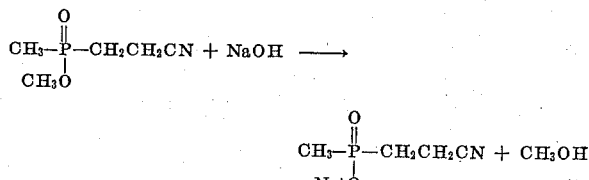

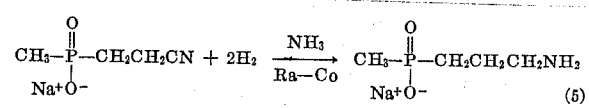

1 Mol (= 147 g) of the methyl ester of 2-cyanoethylmethylphosphinic acid (b.p.$_{.2\ mm}$ = 55°C) which had been obtained from the monomethyl ester of methane phosphonous acid and acrylonitrile was saponified with 1 mol (= 80 g) of 50 percent aqueous sodium hydroxide solution as described in Example 1. The reaction mixture had to be cooled vigorously. Subsequent hydrogenation of the reaction mixture in the presence of 25 g of Raney cobalt and 200 ml of liquid ammonia was carried out at 70°C to 80°C and a hydrogen pressure of 80 to 100 atmospheres by the method described in Example 2. 3-Aminopropyl-methyl phosphinic acid sodium was obtained in quantitative yield with a degree of purity of 95 percent (acidimetric titration).

EXAMPLE 4

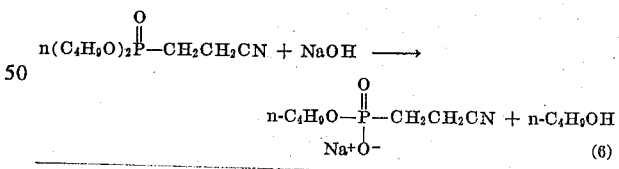

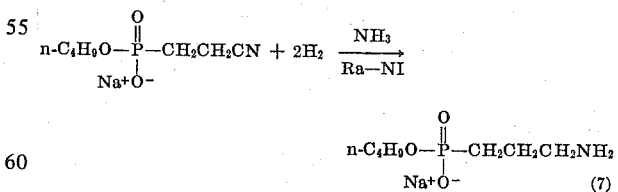

1 Mol (= 247 g) of the di-n-butyl ester of 2-cyanoethanephosphonic acid (b.p.$_{11\ mm}$ = 193°C) and 80 g of 50 percent aqueous sodium hydroxide solution (1 mol) were mixed with stirring for 5 hours at 80°C. The resulting practically neutral solution of the monosodium salt of mono-n-butyl ester of 2-cyanoethane phophonic acid was evaporated to dryness under vacuum and the residue was then taken up in water to a concentration of about 50 percent.

Hydrogenation was carried out as described in Example 2 in the presence of 25 g of Raney nickel and 200 ml of liquid ammonia at 65°C and 70 to 80 atmospheres of hydrogen. After removal of the catalyst by filtration and evaporation of the solution, the sodium salt of 3-aminopropane phosphonic acid mono-n-butyl ester remained behind in practically quantitative yield with a degree of purity of 92 percent (acidimetric titration).

EXAMPLE 5

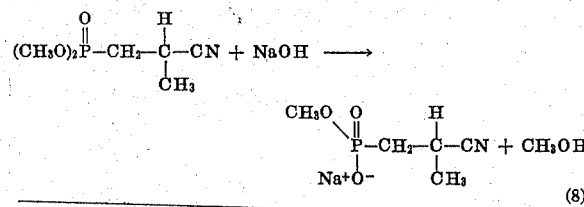

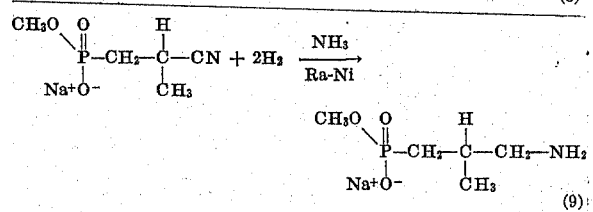

1 Mol ( = 177 g) of 2-cyano-2-methyl-ethane phosphonic acid dimethyl ester obtained from methacrylonitrile and dimethylphosphite was saponified with sodium hydroxide solution as described in Examples 1 and 2 and then hydrogenated. The sodium salt of the monomethyl ester of 2-methyl-3-aminopropane phosphonic acid remained behind in almost quantitative yield and with a degree of purity of 94 percent (acidimetric titration).

EXAMPLE 6

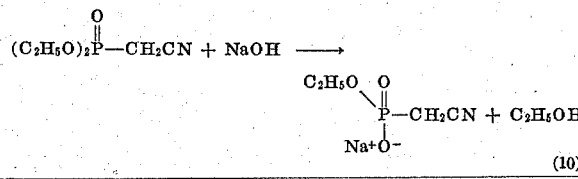

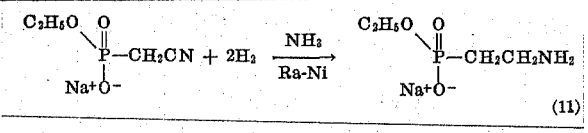

332 g of triethylphosphite (2 mol) were slowly reacted with 75.5 g (1 mol) of chloroacetonitrile at about 150°C so that the ethyl chloride could escape as it was being formed. 166 g of the diethylester of cyanomethane phosphonic acid (b.p.$_{1\ mm}$ = 100°C) were subsequently obtained by distillation.

160 g of this ester were mixed with 118 g of water and reacted at 35°C (with cooling) with 72 g of a 50 percent sodium hydroxide solution (time 2 hours).

340 g of an aqueous alcoholic solution of 145 g of the sodium salt of the monoethyl ester of cyanomethane phosphonic acid were introduced into a stainless steel autoclave of 0.7 l capacity which was equipped with an anchor agitator and gas inlet. 30 g of Raney nickel and 100 ml of liquid ammonia were added. After sealing the autoclave and washing with nitrogen, hydrogen was forced in to a pressure of 80 excess atmospheres. The autoclave was heated to 50°C in the course of one hour, the pressure dropping during this time; the pressure was then increased to 150 atmospheres. The temperature in the autoclave was kept at 50°C until the pressure had dropped to 125 atmosphers and the temperature was then raised to 60°C and kept there for 20 minutes. Hydrogen uptake was terminated after a total of 3 hours. After cooling, the hydrogen and ammonia were released and the solution was freed from catalyst by filtration.

The aqueous solution obtained was evaporated to dryness. The monosodium salt of the monoethyl ester of 2-aminoethane phosphonic acid remained behind in quantitative yield with a degree of purity of 92 percent of the theoretical (acidimetric titration). Faint carboxylic acid bands could be detected as impurities in the infra-red spectrum of the residue.

What is claimed is:

1. A process for preparing a compound of the formula

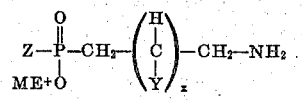

wherein Y is hydrogen or alkyl having one to four carbon atoms; Z is a hydrocarbon radical selected from the group consisting of alkyl having one to five carbon atoms, cycloalkyl having three to six carbon atoms and an aromatic hydrocarbon radical having six to 10 carbon atoms or is one of said hydrocarbon radicals attached to the adjoining phosphorous atom via an oxygen atom; ME is an alkali metal or ammonium ion and x is 0 or 1, said process comprising hydrogenating a nitrile of the formula

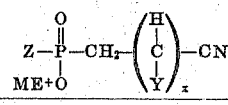

in the presence of a Raney catalyst and liquid ammonia with hydrogen at a temperature of from 0° to 160°C. and at a pressure of from 5 to 150 atmospheres, said Raney catalyst being Raney nickel or Raney cobalt.

* * * * *